(12) United States Patent
Schwarz et al.

(10) Patent No.: US 10,100,745 B2
(45) Date of Patent: Oct. 16, 2018

(54) GEARED TURBINE ENGINE WITH RELATIVELY LIGHTWEIGHT PROPULSOR MODULE

(71) Applicant: United Technologies Corporation, Hartford, CT (US)

(72) Inventors: Frederick M. Schwarz, Glastonbury, CT (US); Gabriel L. Suciu, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 651 days.

(21) Appl. No.: 14/432,377

(22) PCT Filed: Feb. 8, 2013

(86) PCT No.: PCT/US2013/025276
§ 371 (c)(1),
(2) Date: Mar. 30, 2015

(87) PCT Pub. No.: WO2014/058453
PCT Pub. Date: Apr. 17, 2014

(65) Prior Publication Data
US 2015/0252730 A1    Sep. 10, 2015

Related U.S. Application Data

(60) Provisional application No. 61/710,808, filed on Oct. 8, 2012.

(51) Int. Cl.
*F02C 7/26* (2006.01)
*F02C 7/36* (2006.01)
(Continued)

(52) U.S. Cl.
CPC ............... *F02C 7/36* (2013.01); *F02C 3/10* (2013.01); *F02C 3/107* (2013.01); *F02C 7/20* (2013.01);
(Continued)

(58) Field of Classification Search
USPC .............. 60/226.1, 786, 787, 788, 802, 805; 415/149.1, 149.2, 199.4
See application file for complete search history.

(56) References Cited

U.S. PATENT DOCUMENTS

| | | | |
|---|---|---|---|
| 4,798,547 A | 1/1989 | Gearhart | |
| 4,827,712 A * | 5/1989 | Coplin | F02K 3/06 |
| | | | 415/210.1 |

(Continued)

FOREIGN PATENT DOCUMENTS

| | | |
|---|---|---|
| JP | 53143817 | 12/1978 |
| JP | 07217499 | 8/1995 |
| WO | 2014055113 | 4/2014 |

OTHER PUBLICATIONS

Kandebo, Geared-Turbofan Engine Design Targets Cost, Complexity, Aviation Week & Space Technology, vol. 148, Issue 8, pp. 34-35, Feb. 23, 1998.

(Continued)

*Primary Examiner* — Binh Q Tran
(74) *Attorney, Agent, or Firm* — Carlson, Gaskey & Olds, P.C.

(57) ABSTRACT

An example gas turbine engine includes a propulsor assembly including at least a fan module and a fan drive turbine module; a gas generator assembly including at least a compressor section, a combustor in fluid communication with the compressor section, and a turbine in fluid communication with the combustor; and a geared architecture driven by the fan drive turbine module for rotating a fan of (Continued)

the fan module. A weight of the fan module and the fan drive turbine module is less than about 40% of a total weight of a gas turbine engine.

9 Claims, 3 Drawing Sheets

(51) Int. Cl.
  *F02C 7/32* (2006.01)
  *F02C 3/10* (2006.01)
  *F02C 3/107* (2006.01)
  *F02C 7/20* (2006.01)
(52) U.S. Cl.
  CPC ............ *F02C 7/32* (2013.01); *F05D 2220/36* (2013.01); *F05D 2260/40311* (2013.01); *Y02T 50/672* (2013.01); *Y10T 29/49321* (2015.01)

(56) References Cited

U.S. PATENT DOCUMENTS

| | | | |
|---|---|---|---|
| 4,982,914 A * | 1/1991 | Eickmann | B64C 11/28 244/54 |
| 5,344,280 A | 9/1994 | Langenbrunner et al. | |
| 5,591,057 A | 1/1997 | Dai et al. | |
| 5,860,275 A | 1/1999 | Newton et al. | |
| 6,039,542 A | 3/2000 | Schilling et al. | |
| 7,364,402 B2 | 4/2008 | Brault et al. | |
| 7,374,403 B2 | 5/2008 | Decker et al. | |
| 7,828,521 B2 | 11/2010 | Bart | |
| 7,972,109 B2 | 7/2011 | Crall et al. | |
| 8,246,292 B1 | 8/2012 | Morin et al. | |
| 8,720,205 B2 * | 5/2014 | Lugg | F01D 5/03 60/767 |
| 8,857,191 B2 * | 10/2014 | Hyde | F02C 6/00 60/788 |
| 2008/0184694 A1 | 8/2008 | Guimbard et al. | |
| 2009/0269197 A1 | 10/2009 | Evans | |
| 2012/0023899 A1 * | 2/2012 | Yasuda | F02K 3/06 60/224 |
| 2012/0198815 A1 | 8/2012 | Suciu et al. | |
| 2017/0190446 A1 * | 7/2017 | Williams, Sr. | B64G 1/14 |

OTHER PUBLICATIONS

International Preliminary Report on Patentability for International Application No. PCT/US2013/025276 dated Apr. 16, 2015.
Gray, D.E., Energy Efficient Engine Preliminary Design and Integration Studies, Technical Report, Nov. 1, 1978, p. 1-366, Pratt and Whitney Aircraft Group, Commercial Products Div., East Hartford, CT, United States.
Stanley W. Kandebo, Geared-Turbofan Engine Design Targets Cost, Complexity, Aviation Week & Space Technology; New York; Feb. 23, 1998; pp. 1-4.
International Search Report dated Nov. 7, 2013.
Extended European Search Report for Application No. 13845886.4 dated Oct. 2, 2015.

* cited by examiner

| | TOTAL ENGINE WEIGHT (LBS) $ENG_{TOT}$ | FAN MODULE WEIGHT (LBS) $F_W$ | TURBINE MODULE WEIGHT (LBS) $T_W$ | PROPULSOR ASSEMBLY WEIGHT (LBS) $P_{TOT}=F_W+T_W$ | $P_{TOT}/ENG_{TOT}$ |
|---|---|---|---|---|---|
| AN EXAMPLE ENGINE | 6162 | 1261 | 577 | 1838 | 29.8% |
| ANOTHER EXAMPLE ENGINE | 4837 | 1082 | 522 | 1604 | 33.2% |
| YET ANOTHER EXAMPLE ENGINE | 3637 | 712 | 321 | 1033 | 28.4% |

FIG.3

GEARED TURBINE ENGINE WITH RELATIVELY LIGHTWEIGHT PROPULSOR MODULE

CROSS-REFERENCE TO RELATED APPLICATIONS

This application claims priority to U.S. Provisional Application No. 61/710,808, which was filed on 8 Oct. 2012 and is incorporated herein by reference.

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Although geared architectures have improved propulsive efficiency, turbine engine manufacturers continue to seek further improvements to engine performance including improvements to thermal, transfer, and propulsive efficiencies.

SUMMARY

A gas turbine engine according to an exemplary aspect of the present disclosure includes, among other things, a propulsor assembly including at least a fan module and a fan drive turbine module; a gas generator assembly including at least a compressor section, a combustor in fluid communication with the compressor section; and a turbine in fluid communication with the combustor; and a geared architecture driven by the fan drive turbine module for rotating a fan of the fan module. A weight of the fan module and the fan drive turbine module is less than about 40% of a total weight of a gas turbine engine.

In a further non-limiting embodiment of the foregoing gas turbine engine, the fan module comprises no more than 26 fan blades.

In a further non-limiting embodiment of either of the foregoing gas turbine engines, the fan module comprises more than 26 shrouded fan blades.

In a further non-limiting embodiment of any of the foregoing gas turbine engines, the fan drive turbine module comprises a rotor that is configured to rotate more than 2.6 times for every single rotation of the fan.

In a further non-limiting embodiment of any of the foregoing gas turbine engines, the fan drive turbine module comprises directionally solidified blades.

In a further non-limiting embodiment of any of the foregoing gas turbine engines, the fan drive turbine module comprises fewer than six stages.

In a further non-limiting embodiment of any of the foregoing gas turbine engines, the weight of the fan module and the fan drive turbine module is from 28 to 34 percent the total weight of the gas turbine engine.

A gas turbine engine according to another exemplary aspect of the present disclosure includes, among other things, a propulsor assembly of a gas turbine engine, the propulsor assembly including at least a fan module and a fan drive turbine module, the propulsor assembly is less than about 40% of a total weight of a gas turbine engine.

In a further non-limiting embodiment of the foregoing gas turbine engines, the fan module comprises no more than 26 fan blades.

In a further non-limiting embodiment of either of the foregoing gas turbine engines, the fan module comprises more than 26 shrouded fan blades.

In a further non-limiting embodiment of any of the foregoing gas turbine engines, the fan drive turbine module comprises a rotor that is configured to rotate 2.6 times for every single rotation of the fan.

In a further non-limiting embodiment of any of the foregoing gas turbine engines, the fan drive turbine module comprises directionally solidified blades.

In a further non-limiting embodiment of any of the foregoing gas turbine engines, the fan drive turbine module comprises fewer than six stages.

In a further non-limiting embodiment of any of the foregoing gas turbine engines, the propulsor assembly is from 28 to 34 percent the total weight of the gas turbine engine.

A method of distributing weight between a propulsor assembly and a gas generator assembly of a gas turbine engine according to another exemplary aspect of the present disclosure includes, among other things, providing a propulsor assembly that have a first weight, the propulsor assembly including a fan module and a turbine module; and configuring the propulsor assembly for installation within a gas turbine engine having a second weight when the propulsor assembly is installed, wherein the first weight is less than 40 percent of the second weight.

In a further non-limiting embodiment of the foregoing method of distributing weight, the fan module comprises no more than 26 fan blades.

In a further non-limiting embodiment of either of the foregoing methods of distributing weight, the fan module comprises more than 26 shrouded fan blades.

In a further non-limiting embodiment of any of the foregoing methods of distributing weight, the fan drive turbine module comprises a rotor that is configured to rotate 2.6 times for every single rotation of the fan.

In a further non-limiting embodiment of any of the foregoing methods of distributing weight, the propulsor assembly is from 28 and 34 percent a total weight of a gas turbine engine.

Although the different examples have the specific components shown in the illustrations, embodiments of this disclosure are not limited to those particular combinations. It is possible to use some of the components or features from one of the examples in combination with features or components from another one of the examples.

DESCRIPTION OF THE FIGURES

The various features and advantages of the disclosed examples will become apparent to those skilled in the art from the detailed description. The figures that accompany the detailed description can be briefly described as follows:

FIG. 3 shows a comparative table of features of the gas turbine engine of FIG. 2 and other gas turbine engines.

DETAILED DESCRIPTION

Figure 1:
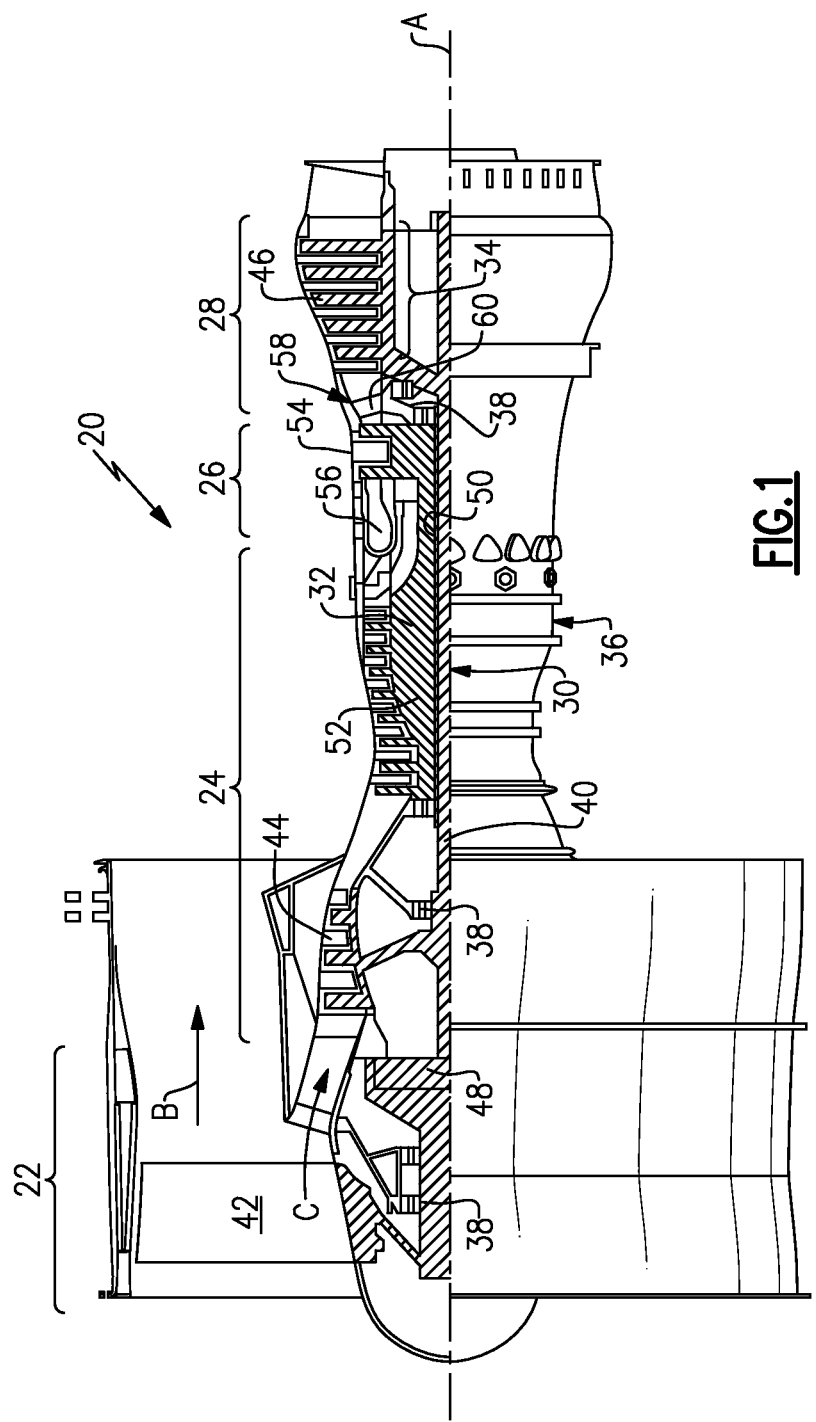
FIG. 1 shows a section view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a gas turbine gas turbine engine, it should be understood that the concepts described herein are not limited to use with gas turbines as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as bucket cruise Thrust Specific Fuel Consumption (TSFC)—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{\wedge}0.5$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment, the low pressure turbine 46 includes about 3 turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

The example gas turbine engine 20 includes weight reduction features facilitating improved efficiency. Example weight reduction features provide a propulsor assembly in the engine 20 that, in total, is less than about 40% of the total engine weight. Engines having a propulsor assembly that is less than about 40% of the total engine weight have been found to have a more efficient and targeted weight distribution than other engines.

Engines having weight distributed in this way have relatively lighter front ends, which may be advantageous as the engine 20 is cantilevered forward of the wing. For example, a pylon structure (not shown) securing the engine 20 to a wing must typically hold the engine 20 under very high g loads and even crash loads. The greater the weight of the fan section, the greater the weight of the pylon structure. The engine 20 and pylon structure are held by the wing where both the weight of the engine 20 and the moment arm of the fan section 22 and the low pressure turbine 46 and the pylon structure must be accommodated.

Figure 2:
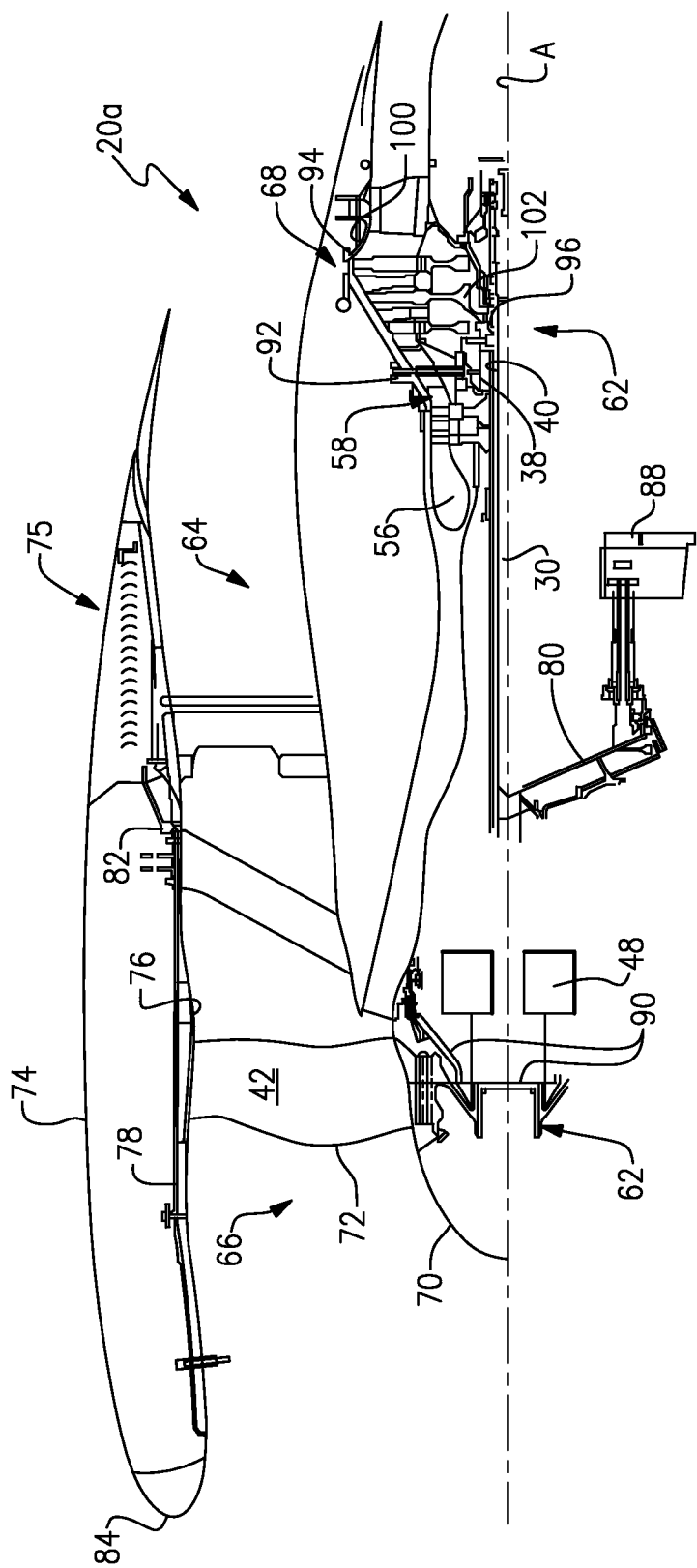
FIG. 2 shows a section view of a portion of an example embodiment of the gas turbine engine of FIG. 1.

Referring to FIGS. 2 and 3 with continued reference to FIG. 1, an example gas turbine engine 20a includes a propulsor assembly 62 and a gas generator assembly 64. In this example, the propulsor assembly 62 includes a fan module 66 and a turbine module 68. Generally, the propulsor assembly 62 includes structures associated with producing thrust. The gas generator assembly 64 includes the remaining portions of the engine 20a. In this example, the turbine module 68 is a low pressure, or fan drive, turbine module.

As known, modular construction of gas turbine engines has developed to facilitate assembly, transportation, and repair. A person having skill in this art in the benefit of this disclosure would understand the general boundaries of the propulsor assembly 62 and gas generator assembly 64 within a gas turbine engine 20a, as well as the modules therein.

The example fan module 66 includes the fan 42. The fan 42 includes a hub 70 and an array of blades 72 extending radially from the hub 70. The hub 70 and blades 72 fit within an annular fan case 76.

A nacelle 74 circumscribes the fan module 66 and other portions of the engine 20a. In this example, a front flange 78 and a rear flange 82 are used to secure the fan module 66 to the nacelle 74 and the gas turbine engine 20a. The terms front and rear are with reference to a general direction of flow through the engine 20a.

In this example, the front flange 78 directly secures the case 76 of the fan module 66 to the nacelle 74 at a position axially forward the blades 72. Components axially forward and radially outward of the flange 78 are considered portions of the nacelle 74.

In this example, the rear flange 82 directly secures the case 76 of the fan module 66 to the nacelle 74 at a position axially rearward the blades 72. Components axially rearward and radially outboard of the rear flange 82 are considered portions of the nacelle 74. The rear flange 82 may attach at a position that is rearward of a fan exit guide vane 86.

In this example, the nacelle 74 is a considered a separate structure from the engine 20a, a thrust reverser system 75, and flanges 78 and 82.

The geared architecture 48 of the gas turbine engine 20a has a bearing compartment front wall 90. The example fan module 66 includes the bearing compartment front wall 90, but does not include other portions of the geared architecture 48. The bearing compartment front wall 90 supports the fan 42. The bearing compartment front wall 90 is typically shipped together with the remaining portions of the fan module 66.

The fan module 66 has a weight $F_w$. The nacelle 74, the front flange 78, and the rear flange 78 are, in this example, excluded when determining the overall weight of the fan module 66.

The turbine module 68 is secured within the engine 20a by at least a front flange 92, a rear flange 94, and hub bolts 96. The front flange 92 secures the turbine module 68 to the mid-turbine frame 58. The rear flange 94 secures the turbine module 68 to a turbine exhaust case 100. The hub bolts 96 secure the turbine module 68 to the inner shaft 40 of the low speed spool 30.

The turbine module 68 has a weight $T_w$. The mid-turbine frame 58, the exhaust case 100, and the shaft 40 are, in this example, excluded when determining the overall weight of the fan module 66.

The propulsor assembly 62 has a total weight $P_{TOT}$, which is the sum of the weight $F_w$ of the fan module 66 and the weight $T_w$ of the turbine module 68. That is, $P_{TOT}=F_w+T_w$.

In addition to the propulsor assembly 62, the example engine 20a includes a gas generator assembly 64. The structures of the gas generator assembly 64 are generally considered to be the portions of the engine 20a that are not part of the propulsor assembly 62. The gas generator assembly 64 has a total weight $G_{TOT}$.

The gas generator assembly 64 thus includes the low pressure compressor 44, the high pressure compressor 52, a diffuser case, and the high pressure turbine 54. The gas generator assembly 64 further includes the mid turbine frame 58, all bearing systems 38, the inner shaft 40, a tower shaft 80, external components, such as an accessory gearbox 88, control and wire harnesses, and pressure sensing devices and tubes, and all other externals and fluids.

In another geared gas turbine configuration utilizing three spools, the gas generator assembly 64 may additionally include an intermediate pressure compressor and intermediate pressure turbine.

As can be appreciated, the engine 20a has a total weight $Eng_{TOT}$, which can be determined by adding the weight $P_{TOT}$ of the propulsor assembly 62 and the weight $G_{TOT}$ of the gas generator assembly 64. That is, $Eng_{TOT}=P_{TOT}+G_{TOT}$.

Components of the example propulsor assembly 62 include features facilitating reduced the weight $P_{TOT}$ of the propulsor assembly 62. In this example, the weight $P_{TOT}$ is less than about 40% of the total engine weight $Eng_{TOT}$.

Example weight reducing features of the fan module 66 can include constructing the blades 72 of one or more relatively lightweight materials, such as aluminum, hollow aluminum, hollow titanium, composite materials and plastic, or some combination of these. The number of blades 72 in the engine 20a is less than about 26, which also contributes to reducing weight.

In some examples, the fan module 66 may include blades 72 of a shrouded fan blade configuration having more than 26 blades. The blades 72 can include a lightweight fan blade leading edge protection features including, but not limited to, a titanium shroud, nickel shroud, and/or a metallic coating in a leading edge region.

The fan module 66 may further include and be enabled by using a lightweight fan blade containment system. A disclosed example lightweight fan blade containment system could include one of or a combination of aluminum, and/or an organic matrix composite material.

The weight of the fan module 66 can be influenced by how many blades 72 are used (few blades 72 may be heavier and more difficult to contain), whether the blades 72 are solid or hollow; whether the blades 72 have a number greater than 26 and therefore require a shroud between blades 72. The fan blades 72 can be titanium solid (inexpensive, heavy); titanium hollow (expensive, light); composite with a metal leading edge (light, expensive); solid aluminum (light, inexpensive) or hollow aluminum (ultra-light, inexpensive). The fan case can be aluminum with a Kevlar containment system (this is cheap and heavy) or can be a wound composite case (more expensive, light in weight).

Additional features facilitating use of a relatively lightweight propulsor assembly 62 within the engine 20a include tapered roller bearings that reduce engine length. A canted fan exit guide vane further provides an efficient load connection between the fan rotor support and an outer barrel of the fan section 22.

Example weight reducing features of the turbine module 68 include a relatively high speed low pressure turbine rotor 102 configured to operate at a rotational speed that is at least 2.6 times the speed of the fan 42. That is, the rotor 102 is configured to rotate 2.6 times for every single rotation of the fan 42.

In this example, the low pressure turbine 46 is a fan drive turbine. Similarly, the turbine module 68 is a fan drive turbine module. Other geared gas turbine configurations that utilize three turbines may also include a fan drive turbine operating within similar speed ratio ranges.

In this example, the low pressure turbine 46 includes fewer than about six stages. The number of stages of the low pressure turbine 46 is an example of many elements that facilitate maintaining the disclosed weight ratio of the propulsor assembly 62 relative to the overall engine weight. Portions of the propulsor assembly, such as the low pressure turbine 46, may include directionally solidified blades.

The low pressure turbine could also be three stages or four. The four stage version may be more efficient, but heavier, than the three stage version. The bearing compartment 38 supporting the low pressure turbine 46 shaft can be at the far end of the shaft 40 (which may be heavier and less expensive) or between the high pressure turbine 24 and low pressure turbine 46 (which may be lighter, more expensive, hotter and a challenge to design and repair).

In the disclosed example listed in FIG. 3, the overall engine weight $Eng_{TOT}$ (which does not include the nacelle structure and mounts) is about 6162 lbs (2795 kg) with a propulsor assembly weight $P_{TOT}$ of about 1838 lbs (834 kg). The propulsor assembly weight $P_{TOT}$ is about 29.8 percent of the total geared gas turbine weight $Eng_{TOT}$. In another disclosed example, the total engine weight $Eng_{TOT}$ is about 4837 lbs (2194 kg) and the propulsor module weight $P_{TOT}$ is about 1604 lbs (728 kg) or about 33.2 percent of the total engine weight $Eng_{TOT}$. In a further disclosed example, the total engine weight $Eng_{TOT}$ is about 3637 lbs (1650 kg) and the propulsor module weight $P_{TOT}$ is about 1033 (469 kg) or about 28.4 percent of the total engine weight $Eng_{TOT}$.

Although an example embodiment has been disclosed, a worker of ordinary skill in this art would recognize that certain modifications would come within the scope of this disclosure. For that reason, the following claims should be studied to determine the scope and content of this disclosure.

We claim:

1. A gas turbine engine comprising:
   a propulsor assembly including at least a fan module and a fan drive turbine module;
   a gas generator assembly including at least a compressor section, a combustor in fluid communication with the compressor section, and a second turbine in fluid communication with the combustor; and
   a geared architecture driven by the fan drive turbine module for rotating a fan of the fan module, wherein a weight of the fan module and the fan drive turbine module is from 28 to 34 percent of a total weight of the gas turbine engine;
   wherein the gas turbine engine includes a high spool and a low spool, the compressor section includes a low pressure compressor and a high pressure compressor, a first shaft interconnecting the second turbine and the high pressure compressor, a second shaft interconnecting the fan drive turbine module and the low pressure compressor, the high spool comprising the high pressure compressor and the second turbine, and the low spool comprising the low pressure compressor and the fan drive turbine module; and
   wherein the fan module comprises no more than 20 fan blades, and a ratio between a total number of the fan blades and a total number of turbine rotors of the fan drive turbine module is between 3.3 and 8.6, and the fan drive turbine module includes at least three stages but fewer than six stages.

2. The gas turbine engine of claim 1, wherein the fan blades are shrouded fan blades.

3. The gas turbine engine of claim 1, wherein the turbine rotors of the fan drive turbine module are configured to rotate more than 2.6 times for every single rotation of the fan.

4. The gas turbine engine of claim 1, wherein the fan drive turbine module comprises directionally solidified blades.

5. A method of distributing weight between a propulsor assembly and a gas generator assembly of a gas turbine engine comprising:
   providing a propulsor assembly that have a first weight, the propulsor assembly including a fan module and a fan drive turbine module; and
   configuring the propulsor assembly for installation within the gas turbine engine having a second weight when the propulsor assembly is installed, wherein the first weight is less than 40 percent of the second weight; and
   wherein the fan module comprises no more than 20 fan blades, and a ratio between a total number of the fan blades and a total number of turbine rotors of the fan drive turbine module is between 3.3 and 8.6, and the fan drive turbine module includes at least three stages but fewer than six stages.

6. The method of claim 5, wherein the fan blades are shrouded fan blades.

7. The method of claim 5, wherein the turbine rotors of the fan drive turbine module are configured to rotate at least 2.6 times for every single rotation of the fan.

8. The method of claim 5, wherein the first weight is from 28 and 34 percent of the second weight.

9. The gas turbine engine of claim 1, wherein the gas generator assembly includes a mid-turbine frame supporting a bearing system, the mid-turbine frame including vanes in a core airflow path between the second turbine and the fan drive turbine module.

* * * * *